US011934815B2

(12) United States Patent
Ravindranath et al.

(10) Patent No.: US 11,934,815 B2
(45) Date of Patent: Mar. 19, 2024

(54) METHOD AND SYSTEM FOR TRANSLATION OF CODES BASED ON SEMANTIC SIMILARITY

(71) Applicant: Tata Consultancy Services Limited, Mumbai (IN)

(72) Inventors: Yogananda Ravindranath, Chennai (IN); Tamildurai Mehalingam, Chennai (IN); Balakrishnan Venkatanarayanan, Chennai (IN); Reshinth Gnana Adithyan, Chennai (IN); Shrayan Banerjee, Chennai (IN); Aditya Thuruvas Senthil, Chennai (IN)

(73) Assignee: Tata Consultancy Services Limited, Mumbai (IN)

( * ) Notice: Subject to any disclaimer, the term of this patent is extended or adjusted under 35 U.S.C. 154(b) by 91 days.

(21) Appl. No.: 17/743,511

(22) Filed: May 13, 2022

(65) Prior Publication Data
US 2023/0034984 A1    Feb. 2, 2023

(30) Foreign Application Priority Data
Jun. 29, 2021   (IN) .............. 202121029245

(51) Int. Cl.
*G06F 8/51*    (2018.01)
*G06F 8/41*    (2018.01)
(52) U.S. Cl.
CPC .............. *G06F 8/51* (2013.01); *G06F 8/427* (2013.01); *G06F 8/433* (2013.01)
(58) Field of Classification Search
CPC ...................................................... G06F 8/51
(Continued)

(56) References Cited

U.S. PATENT DOCUMENTS 10,514,909 B2 * 12/2019 Yahav ........................ G06F 8/75
10,705,814 B2 * 7/2020 Schulte ...................... G06F 8/53
(Continued)

FOREIGN PATENT DOCUMENTS

CN    111597830 A    8/2020
JP    2013-186647 A    9/2013
(Continued)

OTHER PUBLICATIONS

Efstathiou et al., "Semantic Source Code Models Using Identifier Embeddings," (2019).
(Continued)

*Primary Examiner* — Francisco J Aponte
(74) *Attorney, Agent, or Firm* — Finnegan, Henderson, Farabow Garrett & Dunner LLP

(57) ABSTRACT

Code translation is an evolving field and due to advancements in the infrastructure and compute power. The existing methods for code translation are time and effort intensive. A method and system for translation of codes based on the semantic similarity have been provided. A machine learning model is developed, that understands and encapsulates the semantics of the code in the source side and translates the semantic equivalent code which is more maintainable and efficient compared to one to one translation. The system is configured to group a plurality of statements present in the source code together into blocks of code and comprehend the semantics of the block. The system is also trained to understand syntactically different but semantically similar statements. While understanding the semantics of the block and translating, the unused/duplicate code etc. gets eliminated. The translated code is better architected and native to the target environment.

12 Claims, 5 Drawing Sheets

(58) Field of Classification Search
USPC .......................................................... 717/137
See application file for complete search history.

(56) References Cited

U.S. PATENT DOCUMENTS

| | | | |
|---|---|---|---|
| 11,188,322 B2* | 11/2021 | Yahav | ........................ G06F 8/53 |
| 2018/0081655 A1* | 3/2018 | Kudriavtsev | ............. G06F 8/51 |
| 2018/0349114 A1 | 12/2018 | Brown et al. | |
| 2022/0308848 A1* | 9/2022 | Clement | ................... G06F 8/51 |

FOREIGN PATENT DOCUMENTS

| WO | WO 2007/021448 A2 | 2/2007 |
|---|---|---|
| WO | WO 2021/007437 A1 | 1/2021 |

OTHER PUBLICATIONS

Lachaux et al., "Unsupervised Translation of Programming Languages," (2020).
Song et al., "Semantic Neural Machine Translation using AMR," (2019).
Tamarit et al., "Towards a Semantics-Aware Code Transformation Toolchain for Heterogeneous Systems," (2017).
Xie et al., "A Source Code Similarity Based on Siamese Neural Network," Appl. Sci., 10, 7519 (2020).

* cited by examiner

METHOD AND SYSTEM FOR TRANSLATION OF CODES BASED ON SEMANTIC SIMILARITY

PRIORITY CLAIM

This U.S. patent application claims priority under 35 U.S.C. § 119 to: Indian Patent Application No. 202121029245, filed on 29 Jun. 2021. The entire contents of the aforementioned application are incorporated herein by reference.

TECHNICAL FIELD

The disclosure herein generally relates to the field of code translation, and, more particularly, to a method and system for the translation of programming code based on the semantic similarity.

BACKGROUND

Code translation is an evolving field which was existent over years. In the recent times, due to the advancements in the infrastructure and compute power, this field has got a renewed interest. Availability of skilled people who understand the technology is limited and this has also fueled the need for code translations to technologies which are cloud native. Though one to one translation which were once ignored are getting renewed interests due to the cloud advantage, there are many more open issues to be addressed. This type of one to one translation still carries the technical debt to the target side also and are not architecturally native to the target environment. Recent advancements in machine learning (ML) based translations either attempt one to one translations or constrained translations where they are dependent on naming conventions of methods and variables.

Legacy codes have evolved over the years and are maintained by multiple developers. Each maintenance change done by a new developer other than the owner on the code might introduce technical debt to the original architecture. Due to this, there might be many ways in which the same functionality is duplicated/coded and possibility of dead assignments and dead codes in the code are enormous. Though static dead code identification algorithms exist, their relevance in execution context is always questionable. All the above issues make the direct one to one translation of code or the constrained translation techniques difficult to maintain and a solution that involves a complete reverse engineering and forward engineering is also time and effort intensive. In all the above scenarios, the ability to understand the context beyond a statement and group the statements as blocks to make the step of translation is essential.

The existing capabilities of code translation do not go beyond statement to statement translation and hence these methods do not understand the semantics of the code. Syntactically same but semantically similar code understanding does not happen. As the complete code is translated, the technical debt, the unused code, the duplicate code etc. are all translated too and hence is difficult to maintain. Architecturally the translated code resembles the source code which makes it alien to the target environment.

SUMMARY

Embodiments of the present disclosure present technological improvements as solutions to one or more of the above-mentioned technical problems recognized by the inventors in conventional systems. For example, in one embodiment, a system for translation of codes based on a semantic similarity is provided. The system comprises a user interface, one or more hardware processors, and memory. The user interface provides a source code for translation as an input and a target language in which the source code needs to be translated. The memory is in communication with the one or more hardware processors, wherein the one or more first hardware processors are configured to execute programmed instructions stored in the one or more first memories, to: parse the source code using a parser; create a program flow graph using the parsed source code, wherein the program flow graph is used to establish a set of relations between a plurality of statements present in the source code; create a matrix of the established set of relations between the plurality of statements; split the source code into a plurality of blocks using the created matrix, wherein the statements in one block out of the plurality of blocks are closer to each other as compared to other statements irrespective of their physical presence in the source code; vectorize the plurality of blocks to get a plurality of vectorized blocks; train a model to understand a semantic equivalence between the plurality of blocks of the source code irrespective of a manner in which the plurality of blocks is syntactically coded; identify semantically similar statements out of the plurality of vectorized blocks using the trained model; and translate the source code into the target language using a decoder based on the identified semantically similar statements, wherein the decoder is a pretrained machine learning model and configured to choose semantically same, but syntactically different statements.

In another aspect, a method for translation of codes based on a semantic similarity is provided. Initially, a source code is provided for translation as an input. The source code is then parsed using a parser. A program flow graph is then created using the parsed source code, wherein the program flow graph is used to establish a set of relations between a plurality of statements present in the source code. Further, a matrix of the established set of relations between the plurality of statements is created. In the next step the source code is split into a plurality of blocks using the created matrix, wherein the statements in one block out of the plurality of blocks are closer to each other as compared to other statements irrespective of their physical presence in the source code. The plurality of blocks is then vectorized to get a plurality of vectorized blocks. A model is then trained to understand a semantic equivalence between the plurality of blocks of the source code irrespective of a manner in which the plurality of blocks is syntactically coded. In the next step, semantically similar statements are identified out of the plurality of vectorized blocks using the trained model. Further, a target language is selected in which the source code needs to be translated. And finally, the source code is translated into the target language using a decoder based on the identified semantically similar statements, wherein the decoder is a pretrained machine learning model and configured to choose semantically same, but syntactically different statements.

In yet another aspect, there are provided one or more non-transitory machine-readable information storage mediums comprising one or more instructions which when executed by one or more hardware processors cause translation of codes based on a semantic similarity is provided. Initially, a source code is provided for translation as an input. The source code is then parsed using a parser. A program flow graph is then created using the parsed source code, wherein the program flow graph is used to establish a set of relations between a plurality of statements present in the source code. Further, a matrix of the established set of relations between the plurality of statements is created. In the next step the source code is split into a plurality of blocks using the created matrix, wherein the statements in one block out of the plurality of blocks are closer to each other as compared to other statements irrespective of their physical presence in the source code. The plurality of blocks is then vectorized to get a plurality of vectorized blocks. A model is then trained to understand a semantic equivalence between the plurality of blocks of the source code irrespective of a manner in which the plurality of blocks is syntactically coded. In the next step, semantically similar statements are identified out of the plurality of vectorized blocks using the trained model. Further, a target language is selected in which the source code needs to be translated. And finally, the source code is translated into the target language using a decoder based on the identified semantically similar statements, wherein the decoder is a pretrained machine learning model and configured to choose semantically same, but syntactically different statements.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Figure 1:
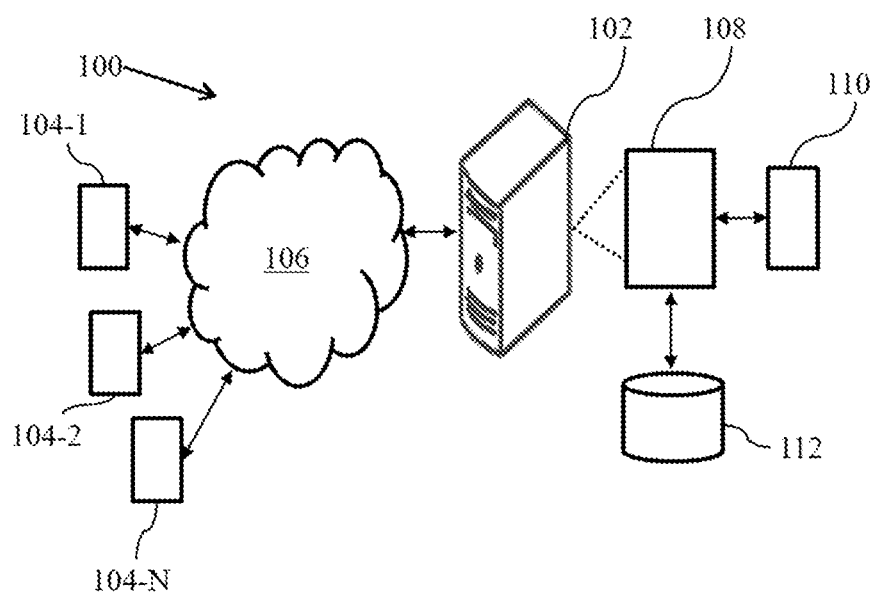
FIG. 1 illustrates a block diagram of a system for translation of codes based on semantic similarity according to some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments.

Code translation is an evolving field and due to the advancements in the infrastructure and compute power, this field has got a renewed interest. The few of the existing methods for code translation involve one-to-one translation or constrained translations where they are dependent on naming conventions of methods and variable. In those cases, dead code is repeated, and architecture becomes heavy. Moreover, same code gets translated repeatedly which results in consumption of more time and effort. The above mentioned issues make the direct one to one translation of code difficult to maintain and a solution that involves a complete reverse engineering and forward engineering is time and effort intensive.

According to some embodiment of the disclosure, a method and a system for translation of codes based on the semantic similarity have been provided to solve the technical problems of the prior art. A machine learning (ML) model is developed, that understands and encapsulates the semantics of the code in the source side and translates the semantic equivalent code which is more maintainable and efficient compared to one to one translation.

The system is configured to group a plurality of statements present in the source code together into blocks of code and comprehend the semantics of the block. The translation is made to the block and not individual statements. The system is trained to understand syntactically different but semantically similar statements. While understanding the semantics of the block and translating, the unused/duplicate code is eliminated and the technical debt that passes from the source to the target during the translation is reduced. As the system understands the semantics of the source system, it tries to group the components also based on defined architectures. The translated code is better architected and native to the target environment.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

FIG. 1 illustrates a network diagram of a system 100 for translation of codes based on the semantic similarity. The codes are normally referred as source codes and are taken from the software program. Although the present disclosure is explained considering that the system 100 is implemented on a server, it may also be present elsewhere such as a local machine. It may be understood that the system 100 comprises one or more computing devices 102, such as a laptop computer, a desktop computer, a notebook, a workstation, a cloud-based computing environment and the like. It will be understood that the system 100 may be accessed through one or more input/output interfaces 104-1, 104-2 . . . 104-N, collectively referred to as I/O interface 104. Examples of the I/O interface 104 may include, but are not limited to, a user interface, a portable computer, a personal digital assistant, a handheld device, a smartphone, a tablet computer, a workstation and the like. The I/O interface 104 are communicatively coupled to the system 100 through a network 106.

In an embodiment, the network 106 may be a wireless or a wired network, or a combination thereof. In an example, the network 106 can be implemented as a computer network, as one of the different types of networks, such as virtual private network (VPN), intranet, local area network (LAN), wide area network (WAN), the internet, and such. The network 106 may either be a dedicated network or a shared network, which represents an association of the different types of networks that use a variety of protocols, for example, Hypertext Transfer Protocol (HTTP), Transmission Control Protocol/Internet Protocol (TCP/IP), and Wireless Application Protocol (WAP), to communicate with each other. Further, the network 106 may include a variety of network devices, including routers, bridges, servers, computing devices, storage devices. The network devices within the network 106 may interact with the system 100 through communication links.

The system 100 may be implemented in a workstation, a mainframe computer, a server, and a network server. In an embodiment, the computing device 102 further comprises one or more hardware processors 108, one or more memory 110, hereinafter referred as a memory 110 and a data repository 112, for example, a repository 112. The memory 110 is in communication with the one or more hardware processors 108, wherein the one or more hardware processors 108 are configured to execute programmed instructions stored in the memory 110, to perform various functions as explained in the later part of the disclosure. The repository 112 may store data processed, received, and generated by the system 100. The memory 110 further comprises a plurality of modules. The plurality of modules is configured to perform various functions. The plurality of modules comprises a block vectorization module 114, a semantic code understanding module 116, and a semantically similar pattern learning module 118.

The system 100 supports various connectivity options such as BLUETOOTH®, USB, ZigBee and other cellular services. The network environment enables connection of various components of the system 100 using any communication link including Internet, WAN, MAN, and so on. In an exemplary embodiment, the system 100 is implemented to operate as a stand-alone device. In another embodiment, the system 100 may be implemented to work as a loosely coupled device to a smart computing environment. The components and functionalities of the system 100 are described further in detail.

Figure 2:
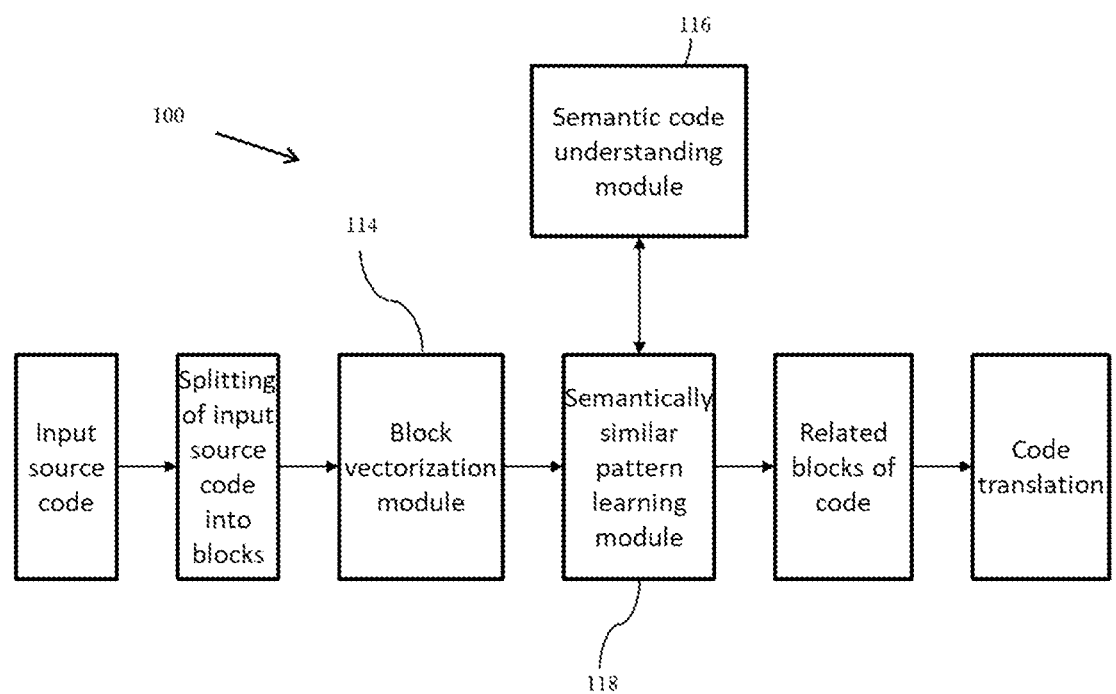
FIG. 2 is a functional block diagram of the system of FIG. 1 for translation of codes based on semantic similarity according to some embodiments of the present disclosure.

According to an embodiment of the disclosure, a functional block diagram of the system 100 for translation of codes based on the semantic similarity is shown in FIG. 2. A software program is normally written in a certain programming language which comprises a number of lines of codes. These codes are referred as the source codes. As shown in FIG. 2, the source code is provided as the input and this input source code is split into a plurality of blocks. The plurality of blocks is then given to the block vectorization module 114. Further, the semantically similar pattern learning module 118 takes the output from the block vectorization module 114 and the semantic code understanding module 116 as input and learns to represent the related blocks of code which are semantically similar. These semantically similar related blocks of code are then translated into a target language selected by the user.

Figure 3:
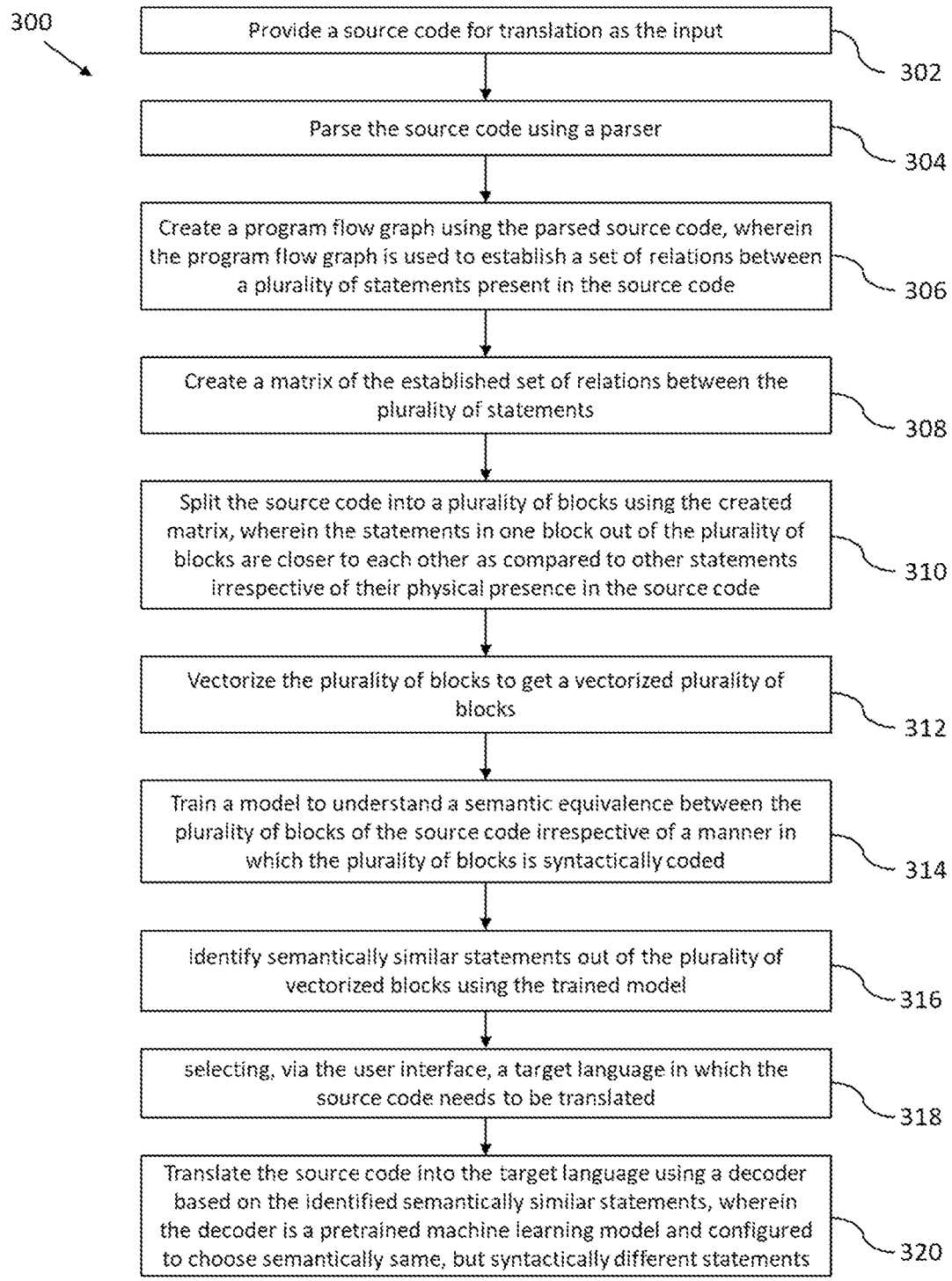
FIG. 3 a flow chart for a method for translation of codes based on semantic similarity in accordance with some embodiments of the present disclosure.

FIG. 3 illustrates an example flow chart of a method 300 for translation of the codes based on the semantic similarity, in accordance with an example embodiment of the present disclosure. The method 300 depicted in the flow chart may be executed by a system, for example, the system 100 of FIG. 1. In an example embodiment, the system 100 may be embodied in a computing device.

Operations of the flowchart, and combinations of operations in the flowchart, may be implemented by various means, such as hardware, firmware, processor, circuitry and/or other device associated with execution of software including one or more computer program instructions. For example, one or more of the procedures described in various embodiments may be embodied by computer program instructions. In an example embodiment, the computer program instructions, which embody the procedures, described in various embodiments may be stored by at least one memory device of a system and executed by at least one processor in the system. Any such computer program instructions may be loaded onto a computer or other programmable system (for example, hardware) to produce a machine, such that the resulting computer or other programmable system embody means for implementing the operations specified in the flowchart. It will be noted herein that the operations of the method 300 are described with help of system 100. However, the operations of the method 300 can be described and/or practiced by using any other system.

Initially at step 302, the source code is provided for translation as the input. At step 304, the source code is parsed using a parser. The use of any existing parser is well within the scope of this disclosure. The control flow of the program along with the data dependencies that can be technically extracted from the code are extracted in this step. In this step only the variable level information is extracted.

Further at step 306, a program flow graph is created using the parsed source code, wherein the program flow graph is used to establish a set of relations between a plurality of statements present in the source code. In an example, there are three type of statement relations;

Whether two statements in the flow are part of the same path (referred to as path index)

Whether there is a definition of a data element in statement 1 which is used in statement 2 (referred to as defined-used index)

Whether the statement 1 contains a definition of a data element that influences statement 2 (referred to as influencing index)

Further, at step 308, a matrix of the established set of relations is created between the plurality of statements. The establish set of relations derived from the previous step is used to create a matrix of relationship between the statements. This information is further processed to get the statements that are closer to each other/compared to other statements irrespective of their physical presence in the code.

At step 310, the source code is split into the plurality of blocks using the matrix, wherein the statements in one block are closer to each other as compared to other statements irrespective of their physical presence in the source code. An example of source code splitting is provided in the later part of the disclosure.

Figure 4:
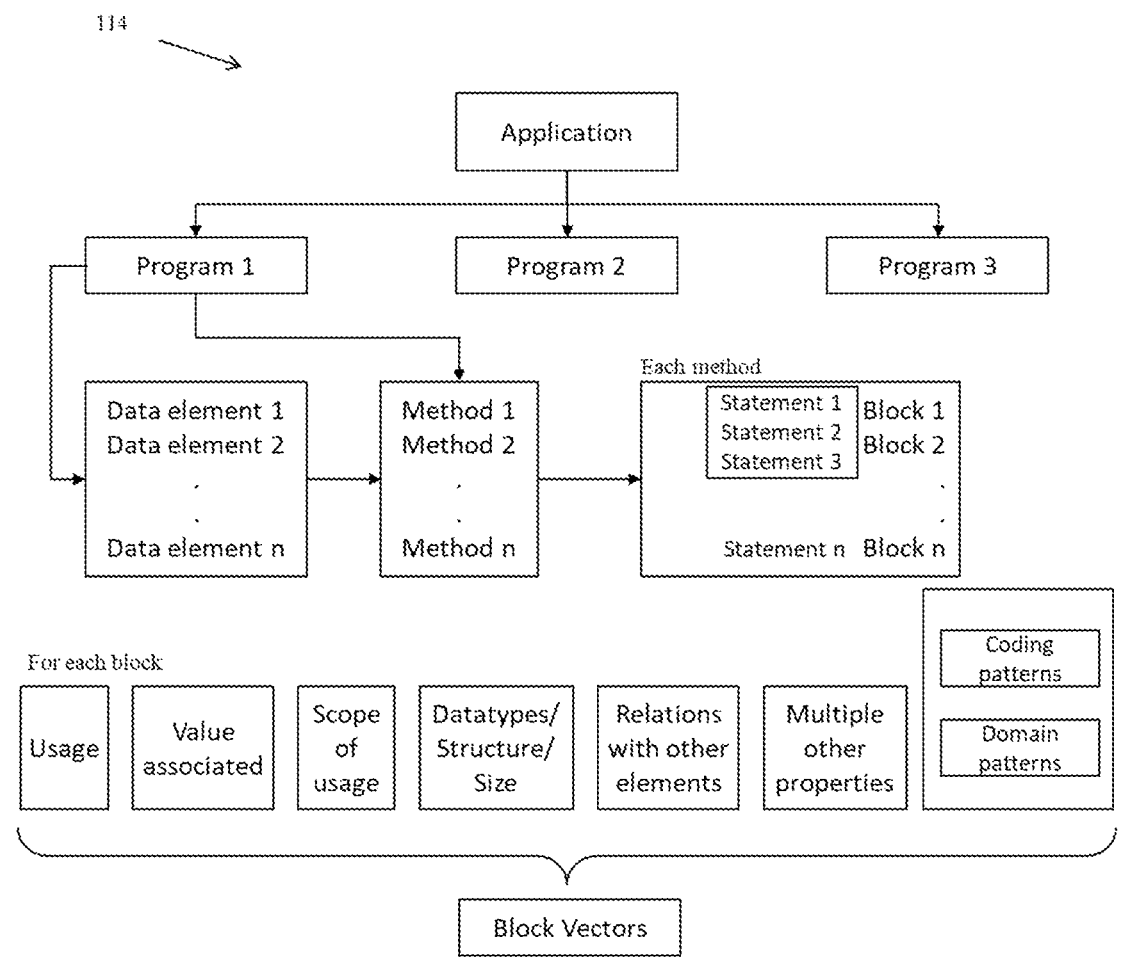
FIG. 4 is a block diagram of the block vectorization module shown in the system of FIG. 2 according to some embodiments of the present disclosure.

At step 312, the plurality of blocks is vectorized to get a vectorized plurality of blocks using the block vectorization module 114. A block diagram of the block vectorization module 114 is shown in FIG. 4. In any software program, there could be one or more programs, say program 1, program 2, program n etc. Each program has one or more data elements and one or more method. Further, each method comprises one or more statements, and these statements are referred as the plurality of blocks. The vectorized plurality of blocks are generated based on multiple properties of the source code such as usage, value associated, scope of usage, data types/structure/size, relation with other elements, coding pattern and domain pattern etc.

At step 314, a model is trained to understand a semantic equivalence between the plurality of blocks of code even if they are syntactically coded in different manner using the semantic code understanding module 116. The main objective is to have the model having a semantically enriched encoder/decoder which drives translation between the source and the target language. A semantically enhanced encoder is trained on source code with the context of semantic equivalence. This gives an edge over understanding different semantical construction within a given language.

At step 316, the method 300 includes identifying semantically similar statements out of the vectorized plurality of block using the trained model utilizing the semantically similar pattern learning module 118. The identification of semantically similar statements leads to understanding blocks of semantically equivalent code which is present throughout the source inventory. This is also a feature in translation wherein the technical debt and duplications that are present in the source inventory is completely optimized and eliminated.

At step 318, a target language is selected by the user using the user interface 104, in which the source code needs to be translated. The translation is completely specific to the target language. And finally, at step 320, the source code is translated into the target language using a decoder (not shown in the figure). The decoder is a pretrained machine learning model and configured to choose semantically same, but syntactically different statements. The choice between semantically same, but syntactically different statements is chosen by the decoder itself. For example, while decoding a looping logic, which loop should be used, a "for" loop or a "while" loop—such decisions are made by the decoder.

Final step of 320 can also be explained with the help of another example as follows. compute vs add functions can be used to describe semantically similar, but syntactically different statements.

Example 1: Compute Statement

COMPUTE FIN-AMT=(PR-AMT*(INT-RT/100))+ACC-CURR-AMT

Example 2: Semantically Similar Arithmetic Statements

DIVIDE 100 INTO INT-RT.
MOVE INT-RT TO VAR-X.
MULTIPLY PR-AMT BY VAR-X.
ADD ACC-CURR-AMT TO VAR-X GIVING FIN-AMT.

Following are the benefits due to the model learning such similarities while translating and decoding
  easier maintenance
  more than one line statements can be converted to single line statement
  unwanted variables (like VAR-X in 2nd example) can be got rid of, which in-turn helps in avoiding redundant memory usage and updates.

The translated target code is not just line to line translation as in any available methods. In the translated code, the technical debts and duplication/dead code are removed through the semantic equivalence analysis. The target decoder also ensures a translation of functionally equivalent code in the target that is native to the target architecture.

Further, semantically similar, but syntactically different statements detection comprises: A supervised dataset is created consisting of varieties of syntactically different but semantically same statements in respective languages. This is performed to ensure that the encoder and decoder have the necessary information to vectorize code blocks in an efficient manner.

The supervised dataset is then preprocessed, wherein variable names are normalized to ensure lesser vocabulary handling hence making it easier for the model to learn. A tokenizer for this model is trained on the dataset and arrives at a lower number of vocabulary due to the repetitive nature of code syntax words. Then, a transformers based model is pre-trained on the respective source code language using a language modelling technique. The model takes in lines of dataset wherein some words/tokens (15% of the input words or tokens) are masked and the model tries to predict what the masked token/word is. Through this pretraining technique, a language model is obtained which now has learnt embeddings of syntax of the associated language.

This model is then further fine-tuned on the created supervised dataset which will train the model to generate similar vectors for semantically similar but syntactically different statements. These statements are sent as pairs together to the model and trained to output mathematically closer vectors for such pairs and distant vectors for unlike pairs. The attention mechanism in the transformer model learns the patterns behind such statements to produce mathematically closer vectors which is then used in further processes. In an example, the transformer based architecture is using: no of attention heads—6 and no of hidden layers—6.

Figure 5:
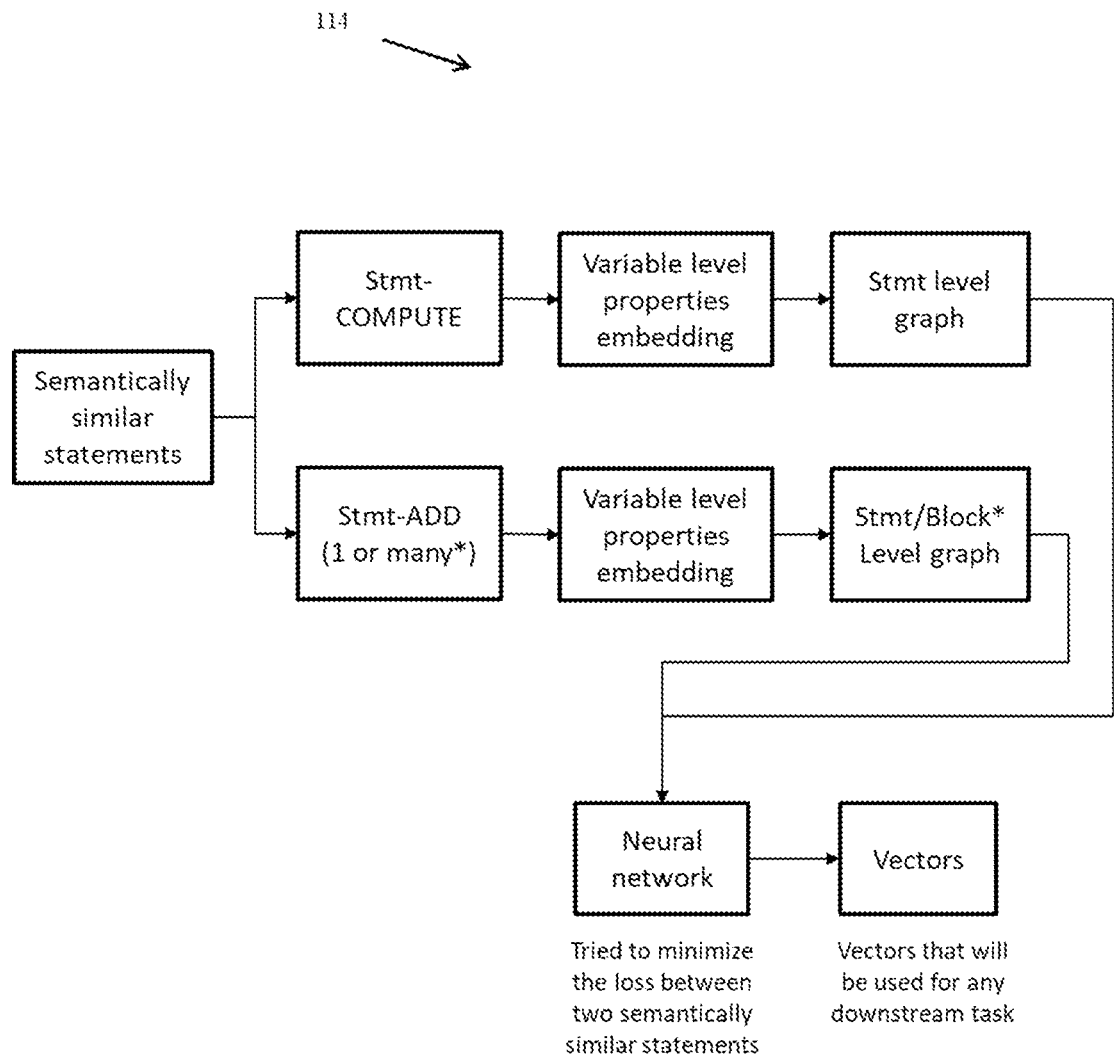
FIG. 5 is a block diagram of the semantic code understanding module shown in the system of FIG. 2 in accordance with some embodiments of the present disclosure.

According to an embodiment of the disclosure, FIG. 5 shows a block diagram of the semantic code understanding module 116. The semantic code understanding module 116 encompasses a Machine Learning (ML) based architecture which when given two blocks will try to represent them based on the semantic similarity irrespective of syntax. For each of the block, variable properties are taken into account and alongside the semantics of the block. The model which is a neural network generates vectors for the blocks based on semantic similarity. This is further utilized by the decoder to translate it into the target language.

In the neural network model, the transformer based model is employed in which the source language code snippet is taken as an input and then encode it using an encoder-based architecture to create a language independent vector format and then the target language-based decoder model is used and finetuned to get the semantically equivalent output for the provided input code snippet.

According to an embodiment of the disclosure, the system 100 can also be explained with the help of following examples:

Example for generation of plurality of blocks:
Example Code Snippet:
  FETCH SAC-CURSOR INTO MINIMUM-BALANCE, DEPOSIT-DURATION. [STMT ID 121]
  MOVE DEPOSIT-ACCOUNT-ID TO ACCOUNT-ID OF DCLACCOUNT [STMT ID 122]
  MOVE 1 TO MULTIPLYING-FACTOR [STMT ID 123]
  IF ACCOUNT-OPENED-IN-SAME-MONTH [STMT ID 124]
    COMPUTE MULTIPLYING-FACTOR=DAYS-ACTIVE-IN-MONTH/TOTAL-DAYS-IN-MONTH. [STMT ID 125]
  IF DEPOSIT-DURATION>30 [STMT ID 126]
    MOVE 0.04 TO INTEREST-RATE [STMT ID 127]
  COMPUTE INTEREST=MINIMUM-BALANCE*INTEREST-RATE/12 [STMT ID 128]

Thus, example of generated one block out of the plurality of blocks is
  FETCH SAC-CURSOR INTO MINIMUM-BALANCE, DEPOSIT-DURATION. [STMT ID 121]
  IF DEPOSIT-DURATION>30 [STMT ID 126]
  MOVE 0.04 TO INTEREST-RATE [STMT ID 127]
  COMPUTE INTEREST=MINIMUM-BALANCE*INTEREST-RATE/12 [STMT ID 128]

| STATEMENT ID 1 | STATEMENT ID 2 | PATH INDEX | DEFINED-USED INDEX | INFLUENCING INDEX |
|---|---|---|---|---|
| 121 | 122 | 1 | 0 | 0 |
| 121 | 123 | 1 | 0 | 0 |
| 121 | ... | 1 | 0 | 0 |
| 121 | 126 | 1 | 1 | 0 |
| 121 | 127 | 1 | 0 | 1 |
| 121 | 128 | 1 | 1 | 0 |
| 122 | ... | 1 | 0 | 0 |
| ... | ... | 1 | 0 | 0 |
| 127 | 128 | 1 | 1 | 0 |

The dotted lines in the above matrix denotes the sequence of permutations which are not significant according to the relationships.

In the above example, ACCOUNT-ID, MULTIPLYING-FACTOR and INTEREST and three different logics. Above is an example of the INTEREST block separated. Likewise, the code is split into blocks of code that pertain to a functionality based on the above method.

Example of identifying semantic equivalence.
Block 1:
PERFORM UNTIL A>30
    ADD 1 TO A
END PERFORM
Block 2:
INCREMENT-A
    COMPUTE A=A+1
CURRENT-PARA
    PERFORM INCREMENT-A
    IF A<30
GO TO CURRENT-PARA In the above example, there are two blocks which are performing certain function, until the value of A reaches 30. This can be done in two separate ways as shown in Block 1 and Block 2. Thus, both the blocks are performing same function, in other words, both are semantically similar, even though the syntax is different for block 1 and Block 2.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The disclosure herein addresses unresolved problem maintaining direct one to one translation of code difficult time and effort efficient. The embodiment thus provides the method and system for translation of codes based on the semantic similarity.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software processing components located therein. Thus, the means can include both hardware means and software means. The method embodiments described herein could be implemented in hardware and software. The device may also include software means. Alternatively, the embodiments may be implemented on different hardware devices, e.g. using a plurality of CPUs, GPUs etc.

The embodiments herein can comprise hardware and software elements. The embodiments that are implemented in software include but are not limited to, firmware, resident software, microcode, etc. The functions performed by various components described herein may be implemented in other components or combinations of other components. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:
1. A processor implemented method for translation of codes based on a semantic similarity, the method comprising:

providing, via a user interface, a source code for translation as an input;
parsing, via one or more hardware processors, the source code using a parser;
creating, via the one or more hardware processors, a program flow graph using the parsed source code, wherein the program flow graph is used to establish a set of relations between a plurality of statements present in the source code;
creating, via the one or more hardware processors, a matrix of the established set of relations between the plurality of statements;
splitting, via the one or more hardware processors, the source code into a plurality of blocks using the created matrix, wherein the statements in one block out of the plurality of blocks are closer to each other as compared to other statements irrespective of their physical presence in the source code;
vectorizing, via the one or more hardware processors, the plurality of blocks to get a plurality of vectorized blocks;
training, via the one or more hardware processors, a semantically enhanced encoder with a context of a semantic equivalence between the plurality of blocks of the source code irrespective of a manner in which the plurality of blocks is syntactically coded;
identifying, via the one or more hardware processors, semantically similar statements out of the plurality of blocks using the trained model;
selecting, via the user interface, a target language in which the source code needs to be translated;
translating, via the one or more hardware processors, the source code into the target language using a decoder based on the identified semantically similar statements, wherein the decoder is a pretrained machine learning model, wherein the pretrained machine learning model is fine-tuned on a supervised data set to generate one or more vectors that are similar in nature and wherein the pretrained machine learning model understands and encapsulates code semantics and translates a semantic equivalent code, and wherein an attention mechanism in a transformer model learns patterns to produce one or more mathematically closer vectors; and
eliminating, via the one or more hardware processors, at least one of unused and duplicate codes from the source code using the set of relations and removing technical debt and the duplicate codes by semantic equivalence analysis.

2. The method of claim 1 wherein the decoder is configured to ensure a translation of functionally equivalent code in the target language that is native to a target architecture.

3. The method of claim 1, wherein the set of relations comprises:
whether two statements amongst the plurality of statements in a program flow are part of the same path,
whether there is a definition of a data element in a first statement which is used in the second statement, and
whether the first statement contains a definition of the data element that influences the second statement.

4. The method of claim 1, wherein the plurality of vectorized blocks are generated based on a plurality of properties of the source code comprising at least one of usage, value associated, scope of usage, data types, data structure, data size, and relations with other data elements.

5. A system for translation of codes based on a semantic similarity, the system comprises:
a user interface for providing a source code for translation as an input and a target language in which the source code needs to be translated;
one or more hardware processors;
a memory in communication with the one or more hardware processors, wherein the one or more first hardware processors are configured to execute programmed instructions stored in the one or more first memories, to:
parse the source code using a parser;
create a program flow graph using the parsed source code, wherein the program flow graph is used to establish a set of relations between a plurality of statements present in the source code;
create a matrix of the established set of relations between the plurality of statements;
split the source code into a plurality of blocks using the created matrix, wherein the statements in one block out of the plurality of blocks are closer to each other as compared to other statements irrespective of their physical presence in the source code;
vectorize the plurality of blocks to get a plurality of vectorized blocks;
train a semantically enhanced encoder with a context of a semantic equivalence between the plurality of blocks of the source code irrespective of a manner in which the plurality of blocks is syntactically coded;
identify semantically similar statements out of the plurality of blocks using the trained model;
select a target language in which the source code needs to be translated; and
translate the source code into the target language using a decoder based on the identified semantically similar statements, wherein the decoder is a pretrained machine learning model, wherein the pretrained machine learning model is fine-tuned on a supervised data set to generate one or more vectors that are similar in nature and wherein the pretrained machine learning model understands and encapsulates code semantics and translates a semantic equivalent code, and wherein an attention mechanism in a transformer model learns patterns to produce one or more mathematically closer vectors; and
eliminate at least one of unused and duplicate codes from the source code using the set of relations and removing technical debt and the duplicate codes by semantic equivalence analysis.

6. The system of claim 5, wherein the decoder is configured to ensure a translation of functionally equivalent code in the target language that is native to a target architecture.

7. The system of claim 5, wherein the set of relations comprises:
whether two statements amongst the plurality of statements in a program flow are part of the same path,
whether there is a definition of a data element in a first statement which is used in the second statement, and
whether the first statement contains a definition of the data element that influences the second statement.

8. The system of claim 5, wherein the plurality of vectorized blocks are generated based on a plurality of properties of the source code comprising at least one of usage, value associated, scope of usage, data types, data structure, data size, and relations with other data elements.

9. One or more non-transitory machine-readable information storage mediums comprising one or more instructions which when executed by one or more hardware processors cause:

providing, via a user interface, a source code for translation as an input;

parsing, the source code using a parser;

creating, via the one or more hardware processors, a program flow graph using the parsed source code, wherein the program flow graph is used to establish a set of relations between a plurality of statements present in the source code;

creating, via the one or more hardware processors, a matrix of the established set of relations between the plurality of statements;

splitting, via the one or more hardware processors, the source code into a plurality of blocks using the created matrix, wherein the statements in one block out of the plurality of blocks are closer to each other as compared to other statements irrespective of their physical presence in the source code;

vectorizing, via the one or more hardware processors, the plurality of blocks to get a plurality of vectorized blocks;

training, via the one or more hardware processors, a semantically enhanced encoder with a context of a semantic equivalence between the plurality of blocks of the source code irrespective of a manner in which the plurality of blocks is syntactically coded;

identifying, via the one or more hardware processors, semantically similar statements out of the plurality of blocks using the trained model;

selecting, via the user interface, a target language in which the source code needs to be translated;

translating, via the one or more hardware processors, the source code into the target language using a decoder based on the identified semantically similar statements, wherein the decoder is a pretrained machine learning model, wherein the pretrained machine learning model is fine-tuned on a supervised data set to generate one or more vectors that are similar in nature and wherein the pretrained machine learning model understands and encapsulates code semantics and translates a semantic equivalent code, and wherein an attention mechanism in a transformer model learns patterns to produce one or more mathematically closer vectors; and eliminating, via the one or more hardware processors, at least one of unused and duplicate codes from the source code using the set of relations and removing technical debt and the duplicate codes by semantic equivalence analysis.

10. The one or more non-transitory machine-readable information storage mediums of claim 9 wherein the decoder is configured to ensure a translation of functionally equivalent code in the target language that is native to a target architecture.

11. The one or more non-transitory machine-readable information storage mediums of claim 9, wherein the set of relations comprises:

whether two statements amongst the plurality of statements in a program flow are part of the same path, whether there is a definition of a data element in a first statement which is used in the second statement, and whether the first statement contains a definition of the data element that influences the second statement.

12. The one or more non-transitory machine-readable information storage mediums of claim 9, wherein the plurality of vectorized blocks are generated based on a plurality of properties of the source code comprising at least one of usage, value associated, scope of usage, data types, data structure, data size, and relations with other data elements.

\* \* \* \* \*